United States Patent [19]

Solberg, Jr.

[11] Patent Number: 5,178,760

[45] Date of Patent: Jan. 12, 1993

[54] FLUID FILTER CONSTRUCTION WITH A CORRUGATED AND TAPERED FILTER STRIP STRIP

[75] Inventor: Charles H. Solberg, Jr., Barrington, Ill.

[73] Assignee: Solberg Mfg. Co., Itasca, Ill.

[21] Appl. No.: 520,962

[22] Filed: May 4, 1990

Related U.S. Application Data

[63] Continuation-in-part of Ser. No. 334,215, Apr. 6, 1989, abandoned.

[51] Int. Cl.⁵ .............................................. B01D 29/05
[52] U.S. Cl. ................................. 210/451; 210/493.5;
210/494.3; 55/503; 55/511; 493/343; 493/356; 493/941
[58] Field of Search ................... 210/493.1, 498, 493.2,
210/493.5, 494.1, 450, 451, 445, 453, 493.3,
494.3; 55/497, 500, 521, 529, 498, 502, 503, 511;
493/343, 356, 941; 264/506, 505, DIG. 48;
156/218

[56] References Cited

U.S. PATENT DOCUMENTS

| | | | |
|---|---|---|---|
| 2,521,984 | 9/1950 | Lang | 55/529 |
| 2,952,342 | 9/1960 | Schrittker | 55/529 |
| 2,973,833 | 3/1961 | Cook | 55/521 |
| 3,296,781 | 1/1967 | Schumann | 55/497 |
| 3,394,713 | 7/1968 | Thomsen et al. | 55/529 |
| 3,465,413 | 9/1969 | Rosaen et al. | 55/521 |
| 3,873,288 | 3/1975 | Wachter et al. | 55/497 |
| 3,970,440 | 7/1976 | Copenhefer et al. | 55/529 |
| 4,169,059 | 9/1979 | Storms | 55/497 |
| 4,439,321 | 3/1984 | Taki et al. | 55/521 |
| 4,976,857 | 12/1990 | Solomon | 210/493.5 |

Primary Examiner—Robert A. Dawson
Assistant Examiner—W. L. Millard
Attorney, Agent, or Firm—Laff, Whitesel, Conte & Saret

[57] ABSTRACT

A filter device including a separable housing and cannister-like means, with the improved filter element retained in the latter. The filter element being an elongated tapered strip having a predetermined transverse dimension at its midsection generally equivalent to the diametral measurement of the interior of said cannister and the initial configuration of the tapered sides being equated to the various chordal dimensions of the interior of the cannister-like means integrated with the folds of the filter element, thereby providing a filter element of controllable increased filtration area.

20 Claims, 4 Drawing Sheets

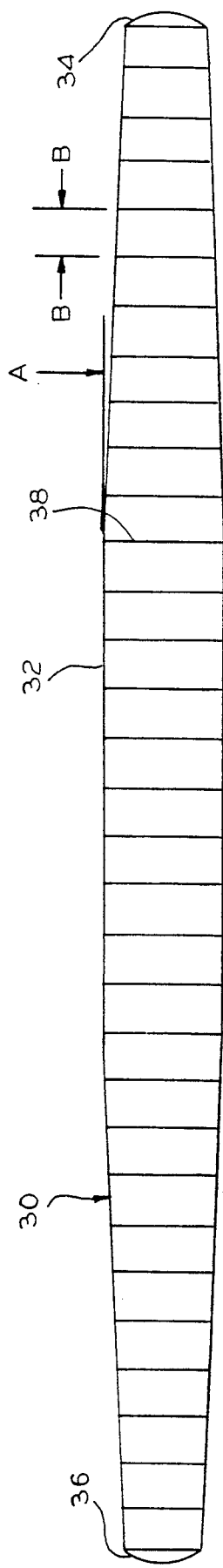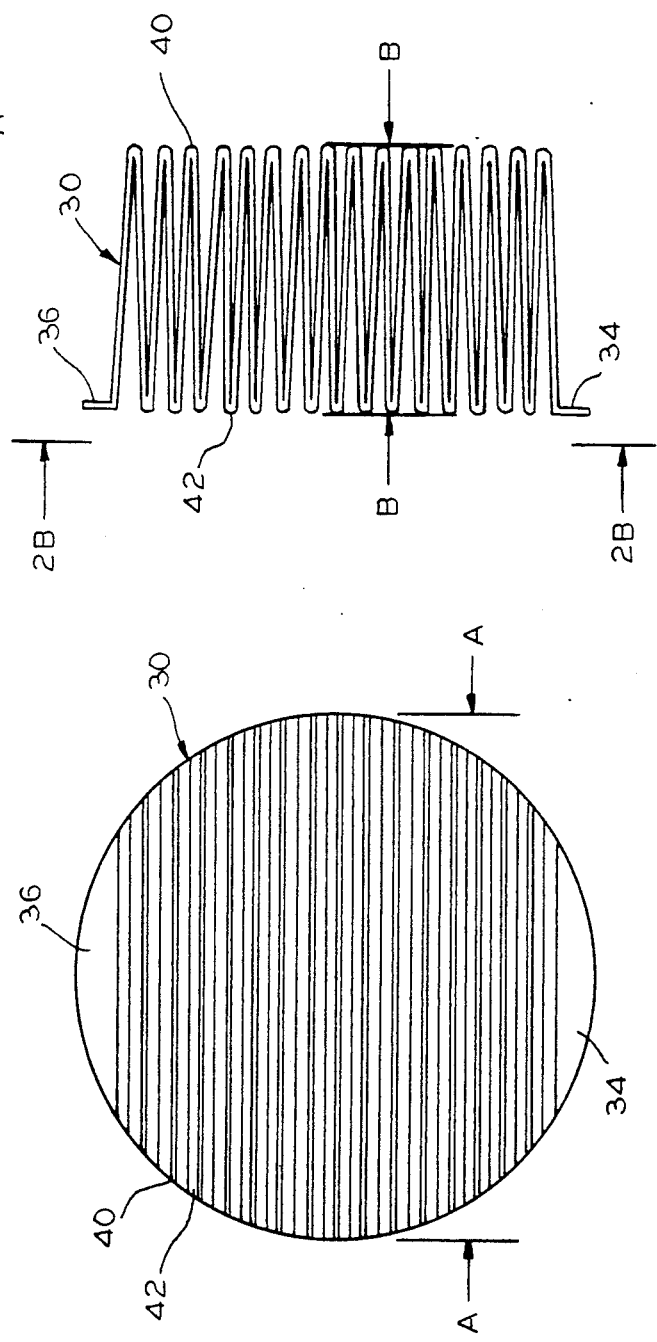
FIG.2A
FIG.2B
FIG.2C

FLUID FILTER CONSTRUCTION WITH A CORRUGATED AND TAPERED FILTER STRIP STRIP

This is a continuation-in-art of co-pending application, Ser. No. 07/334,215, filed Apr. 6, 1989, now abandoned.

BACKGROUND OF THE INVENTION

The present invention relates to fluid filters and more particularly to air filters having disposable filter cartridges that can be replaced.

PRIOR ART

The prior art is replete with examples of air filtration devices utilizing porous materials such as pleated or zig-zag corrugated sheet materials, for example, note the U.S. Pat. Nos. 3,869,392 to Wolf; 3,873,288 to Wachter et al.; 2,973,833 to Cook; 3,069,831 to Young et al.; 4,714,486 to Silverthorn; 3,815,754 to Rosenberg; 3,296,781 to Schumann; and 4,430,223 to Miyakawa et al. All of these patents, except Schumann '781 and Miyakawa et al '223, the devices are either rectangular or square, or, alternatively, the basic filter material is initially square in configuration and then trimmed to a round configuration. In the case of those where the chamber surrounding the filter is rectilinear, i.e., square, rectangular, or polygonal, there is a great degree of turbulence created within the chamber when the fluid passes from a cylindrical fluid flow into a rectilinear chamber and then back out into another cylindrical tubular exhaust means.

Additionally, in those instances where an initially rectangular flat material is clamped into a circular frame and trimmed, there are definite limitations as to the depth of corrugation that can be created without serious crimping problems about the periphery thereof due to an undue amount of material being folded and dragged down into the round configuration, for example, see the structure shown in Young et al '831, as well as appreciating the increased thickness of material realized when the free ends of the transverse corrugations are crimped, as at 12, and secured by the crimp ring 13.

The means for securing the filter element within the supporting means or frame are widely varied. In Wolf '392 he utilizes a pleated rectangular filter material reinforced by a pair of sheet metal strips at opposite end folds. The sheet metal strips and the edges of the rectangular material being embedded during molding of the frame. This configuration is subject to the problems set forth above.

As mentioned above, Cook '833 crimps his filter material and is confronted by excessive folds of material at the periphery which result in difficulties in obtaining a proper seal at his outer edges. Similarly, Young et al '831 is confronted not only with the folding problem at the periphery but also with the limited draft or depth of corrugations available to him, hence, a limited filter area.

The Wachter et al '288 provides a pair of ring members having intermeshing fingers for engaging and clamping rectangular folded filter material, to which material the rings are then glued and the excess material trimmed after assembly. This involves excessive costs of manufacture and labor.

Similarly, the patents to Rosenberg '754 and Silverthorn '486 disclose square filters positioned with box-like containers and where the filter is either sealed in place by an adhesive or bonding compound utilized in the construction of the box (as shown in Rosenberg '754) or by being spun into place by centrifugal force (as shown in Silverthorn '486). Both of these alternatives requiring secondary operations which always adds to the cost of manufacture of a simple device.

Note should also be made of the patents to Miyakawa et al '223 and Schumann '781 which are directed to filter elements which are corrugated and disposed in a annular rings. As will be appreciated, filters of this configuration are difficult to fabricate and involve intricate sealing efforts at the free butting ends of the annular rings and in mounting means, i.e., the attempts at adhesion in annular grooves as shown in Schumann '781.

SUMMARY OF THE INVENTION

Improved filter devices in accordance with the present invention are adapted for use in air compressor inlets and provide an increased area of filter element exposure in a round configuration for removing solid and liquid particulate matter, such as, dust, smoke, soot, tars, oils, etc. from the air being supplied to the compressor to preserve same from injury from such particulate matter.

The present invention contemplates a configuration of filter element which can be varied at will by controlling the depth or amplitude of each fold or convolution of the filter element, as well as to vary the frequency or number of folds in the filter element to thereby readily control the total area of filter element exposed to the fluid matter being filtered.

The present invention contemplates utilizing an elongated strip-like element which tapers from its midsection towards at least one end where the filter is formed into a curvilinear configuration in at least one end. The elongated strip-like element can be tapered toward each end where the ultimate filter includes a curvilinear portion at each end, or is generally circular in configuration. The midsection transverse dimension is related to the predetermined transverse or diametral dimension of the supporting means bore with which the element is to be associated, and each transverse fold line dimension is related to the chordal dimension of said supporting means bore and is determined from and dependent upon the frequency or spacing of folds contemplated in the filter element as well as the amplitude or axial extent of the folds.

An object of the present invention is to provide an economical self-supporting filter device wherein the filter element is capable of providing an increased area of available filtration when compared with comparable external size filter configurations to those presently found in the marketplace.

Another object of the present invention is to provide an integral sealing means on the filter supporting means for cooperative sealing with the housing means to eliminate the need for secondary seal means.

Still another object of the invention is to provide an improved, economical filter means having superior characteristics that can be readily manufactured and be economically competitive with the marketplace.

These and other objects will be apparent to those skilled in the art when the specification is read in conjunction with the attached drawings. It being expressly understood, however, that the drawings are for purposes of illustration only and are not intended as a definition of the limits of the invention.

BRIEF DESCRIPTION OF THE DRAWINGS

In the accompanying drawings, which illustrate exemplary embodiments of the present invention:

FIG. 2A is a plan view of the flat blank of a filter element of the type contemplated by the present invention, the specific dimensions of the element shown being merely representative due to the strictures of drawing size limitations;

FIG. 2B is a top or plan view of the filter element, taken along line 2B—2B in FIG. 2C, after being corrugated from a flat form of the type shown generally in FIG. 2 above;

FIG. 2C is an elevational side view of the corrugated filter element;

DETAILED DESCRIPTION

Figure 1:
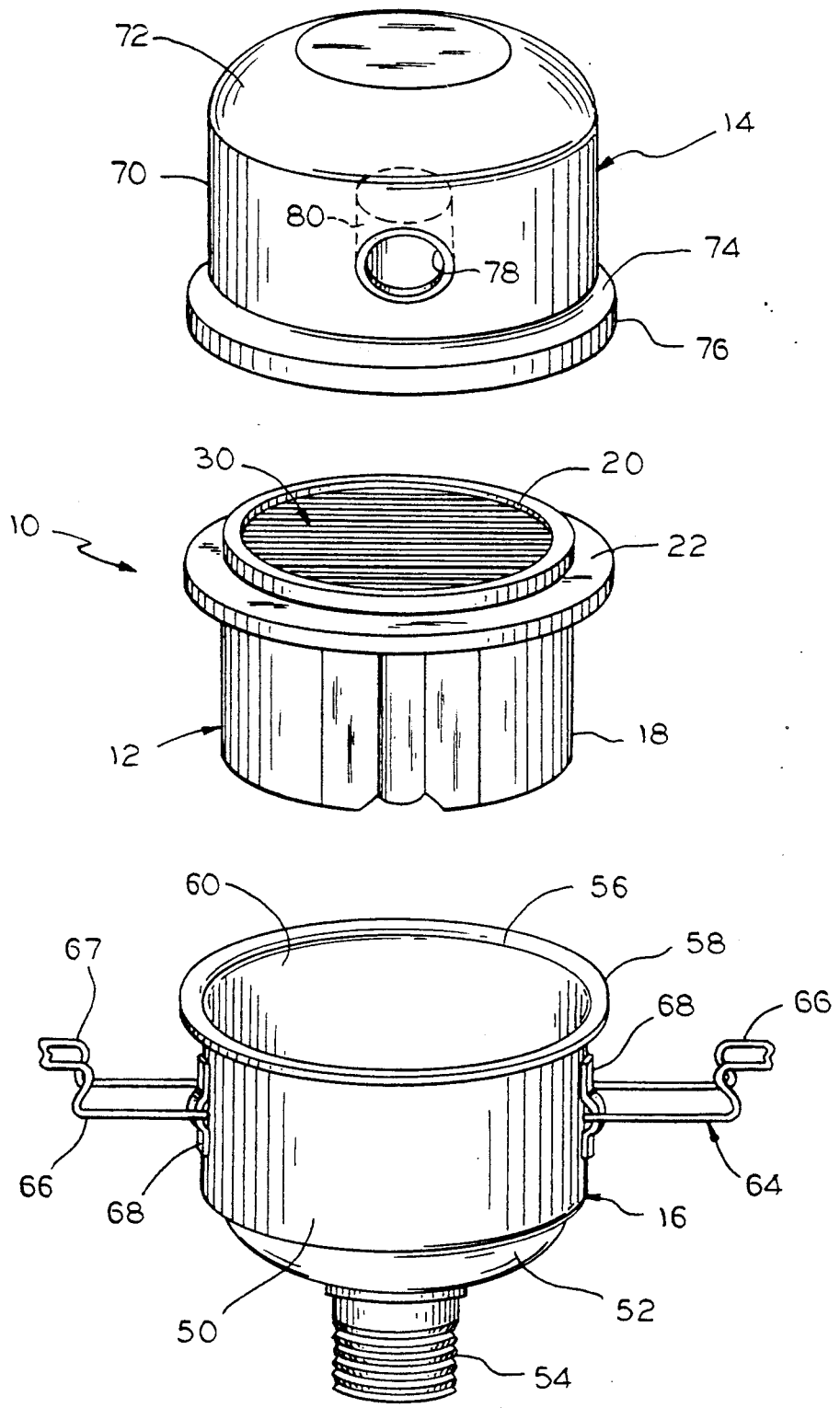
FIG. 1 is an exploded view of the preferred improved filter element of the present invention in relation to one type of housing with which it can be associated.

Referring now to the drawings wherein similar parts are designated by similar numerals, the present invention contemplates an improved filter element that is self-supporting within an integral support means or body to form a filter cartridge, with that cartridge being sealingly accepted within a housing means that forms the chamber for accepting the cartridge and carrying out the filtration of particulate matter from the fluid being filtered, the preferred embodiment of this invention being utilized in air compressors, among other things.

FIG. 1 shows an exploded view of a filtering device 10 which includes filter cartridge 12 and a housing having an upper housing portion 14 and a lower housing portion 16.

In this embodiment, the cartridge 12 has a body 18, generally cylindrical in configuration with a predetermined diameter bore 20 traversing the body from end to end. Intermediate the extremities of body 18 is a laterally extending flange means 22, for purposes best set forth hereinafter, while internally of bore 20 is a folded or corrugated filter element 30 extending transversly and integrally between opposite sides of bore 20 along chordal lines thereof. The acceptance of cartridge 12 within the housing portions 14 and 16 and their related operation will be set forth hereinafter.

Referring now to FIGS. 2-5, the present invention contemplates the use of a unique and novel configuration of filter element that provides increased filter area within a shell normally utilized today for filter configurations having much smaller exposed areas for filtration. As was set forth above in the prior art descriptions, the method of manufacturing filters in the past was confronted with large waste of filter element material as well as the problem of bunching or gathering of the folds of the filter material at the transverse free edges of the folded material when folded from a rectilinear configuration blank that then had to be crimped and trimmed into a circular configuration.

In the present invention it is contemplated that the initially flat filter element 30 is an elongated member that tapers along both edges from its widest dimension at its midsection 32 toward its opposite ends 34 and 36, which are rounded to form a tongue-like flange. The illustrated blank in FIG. 2A is merely representative and is not to the scale of the folded filter elements 30 shown in FIGS. 2B and 2C, however, the transverse lines 38 shown in FIG. 2A are representative of fold lines for lower folds 40 and upper folds 42 and would relate to and be slightly larger than the chordal dimension of the bore 20 at the point of intersection of the folded filter element and said bore at the point of juncture or integration with the body 18.

Referring once again to FIG. 2A, the width of the element 30 as measured by the arrows A—A is representative of a relative chordal dimension with which the element is to be associated. A portion of each side of that particular segment of the strip will be integrated with the body 18, as shown by the dotted line 19 in FIG. 3. The measurement indicated by the arrows B—B in FIG. 2A is representative of the amplitude or axial length of the folds and will be strongly controlling in determining the total area of the filter element.

Figure 3:
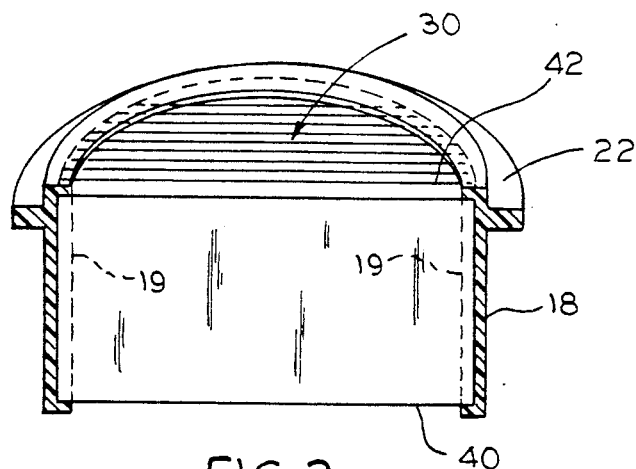
FIG. 3 is a partial cross-sectional front elevation view of the corrugated filter element integrally mounted in a supporting means, as viewed along line 3—3 of FIG. 4.
Figure 5:
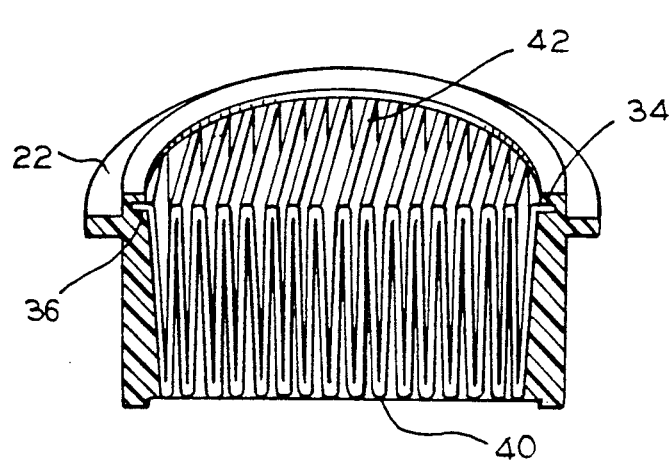
FIG. 5 a side elevation view, in partial section, taken along line 5—5 of FIG. 4.

Suitable die means (not shown) that are slightly smaller in transverse dimensions than the chordal dimensions of the folded filter element 30 are positioned on opposite sides of the filter element within the cavities formed by folds 40 and 42 of element 30 and while supporting the folded element 30 are inserted into an appropriate mold cavity (not shown) that is slightly larger than the chordal dimensions of element 30 and which includes cavity means for forming the laterally extending supporting flange means 22. Injection molding of thermoplastic material causes the material to flow around and encapsulate the free end edges of the transverse folds 40 and 42 (as seen in FIG. 3 by the dotted lines 19) as well as the end tongue-like flanges 34, 36 (as seen in FIG. 5) into sealing integral relationship with the body 18.

The assembly of the filter device 10 can be best appreciated by referring to FIG. 1. The lower body portion 16 in this embodiment including a generally cylindrical open end cup shape element 50 having one closed end 52 provide with a central aperture sealingly accepting a tubular member or pipe 54 that communicates with the interior of element 50. At its opposite open end 56 it is provided with a laterally extending flange means 58. The inner bore 60 of element 50 being generally complimentary to the diameter of body 18 of cartridge 12 and with flange 58 being capable of supporting flange 22 of cartridge 12. Suitable fastening means 64 may be integrally fastened to lower portion 16. In the illustrated embodiment the fastener means includes a pair of spring wire snap fasteners 66 that are rotatably supported by yoke-like brackets 68 fastened to element 50, as by welding.

The upper body portion 14 of the housing means is also a mating inverted cup-shaped member having a substantially cylindrical shell 70 closed at one end 72 and having a laterally extending flange 74 adjacent its opposite end. Flange 74 is slightly larger in diametral extent than flange 58 on the lower portion 16 and carries an axially extending cylindrical extension flange 76 that complimentarily surrounds flange 58. Thus, when the cartridge 12 is telescoped into the lower portion 16 of the housing and the extension flange 76 of upper portion 14 is telescoped around flange 58, the inner surface of flange 74 is brought to bear in sealing relation with flange 22 of cartridge 12. This is further enhanced by swinging the wire snap fasteners 66 upwardly until their reversely bent edges 67 resiliently engage the upper surface of flange 74 to complete the assembly.

While egress from the interior of the closed housing is provided by the tubular pipe means 54, ingress is provided by the side aperture 78 in the upper housing portion 14. As is common practice in such filter devices a limited stub pipe or nipple extends into the housing to guide input air over the end of the filter element in an indirect fashion so that the in rushing air does not directly impinge on the filter and possibly tear same as a result of the pulsations generally experienced with compressors.

It will be noted in the illustrated embodiment that the closed ends 52 and 72 of the housing may also be domed to accommodate the pressure normally experienced by such devices.

Figure 6A:
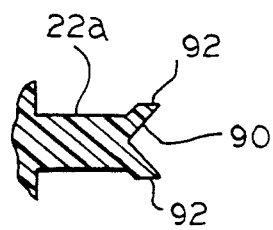
FIGS. 6A, 6B and 6C are partial sectional views of three embodiments of the laterally extending flange means and showing three variations of integral sealing means capable of being associated with the flange means.
Figure 4:
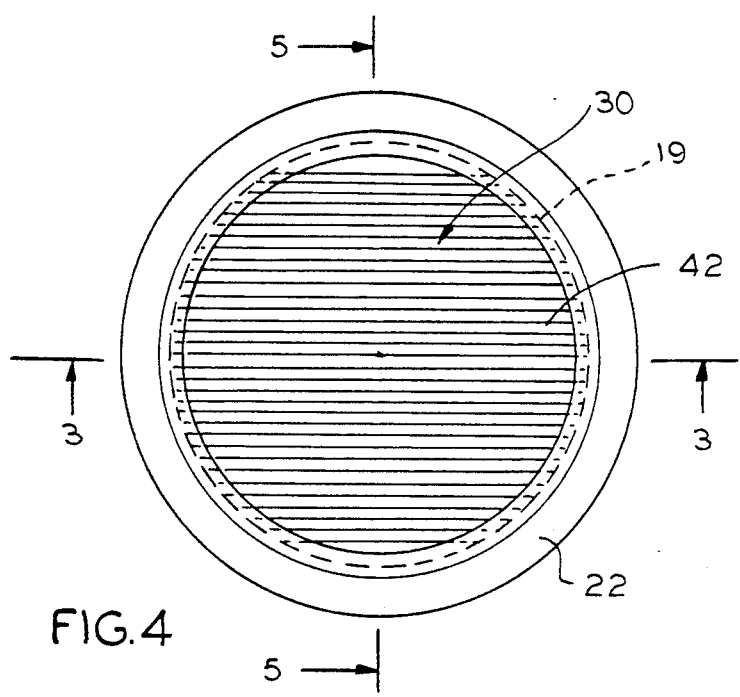
FIG. 4 is a top plan view of an integrally assembled filter element with the supporting means.
Figure 6B:
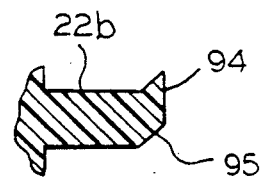
Figure 6C:
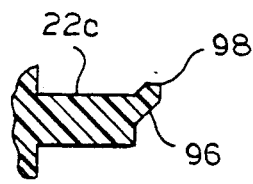

Experience has proven that resilient sealing means is preferable between the flange 22 of cartridge 12 and flange 74 to compensate and seal small imperfections in the joint formed by the flanges 22 and 74. In many instances a secondary sealing member such as an "O"-ring or a plastisol seal can be utilized to overcome these deficiencies. However, other possible solutions are shown in FIGS. 6A, 6B and 6C. These figures show partial sectional views of three embodiments of sealing means that could be incorporated as an integral part of cartridge flange 22. (In these embodiments the flange 22 is designated with the additional of the suffixes a, b, and c).

In FIG. 6A the flange 22a includes a continuous annular swallow-tail free edge, including a cavity of groove 90 positioned between lateral resilient extensions 92 that project axially beyond the planes falling on the upper and lower surfaces of flange 22a. Extensions 92 will flex into cavity 90 when they are connected by flanges 58 and 74 and will provide an integral seal between the cartridge 12 and the housing.

A second embodiment of an integral seal is illustrated in FIG. 6B and includes flange 22b with an upwardly extending flexible tapered rim 94 and a flange relief 95 below rim 94 to accommodate the material of rim 94 if it is crushed upon contact between flanges 58 and 74.

The third embodiment of an integral seal is shown in FIG. 6C. In this embodiment the flange 22c includes an integral laterally upwardly extending annular ring 96 having a tapered cross-section leading to a point 98 that in the annular configuration provides a flexible line contact with flange 74 for a sealing seat therewith.

Figure 7:
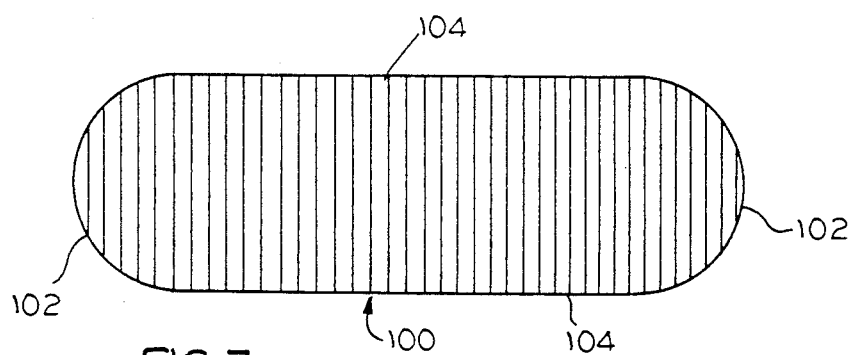
FIG. 7 is a top plan view of a corrugated filter element for use in an elongated oval bore of a supporting element, not shown.
Figure 8:
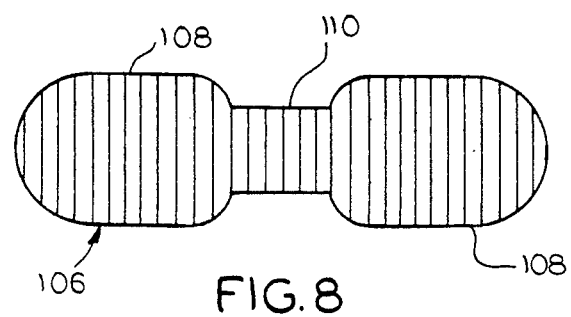
FIG. 8 is a top plan view of another corrugated filter element for use in a dual curvilinear bore interconnected by an intermediate section, not shown.

While the embodiments described above have utilized a circular plan configuration it must be appreciated that the techniques involved therein are equal applicable to other curvilinear or trapezoidal configurations of filter devices for accommodation within predetermined shapes available for passage of fluids that must be filtered. For example, certain devices may have restricted support means that must traverse or occupy portions of the passageway normally utilized for the passage of fluids and hence due to these space restrictions normal filter means cannot be utilized and the oval, dumbell or other assymetrical configurations of filters having at least one curvilinear end to improve fluid flow must be utilized. The oval configuration filter 100 shown in FIG. 7 having two curvilinear ends 102 has generally flat sides 104 interconnecting the ends 102, but could utilize an elongated ellipsoidal configuration if desirable and compatible with the environment within which it is to be utilized. The double curvilinear filter member 106, shown in FIG. 8, can be utilized with devices having a centrally restricted opening or bore, with the end portions 108 interconnected by a suitable central portion 110, the latter configured to be accepted within the restricted bore mentioned above, but not shown. It also can be utilized where a single or multiple source or target bore is connected to the opposite thereof, i.e., two cylindrical bores feed into a single oval bore, or vice-versa.

Figure 9:
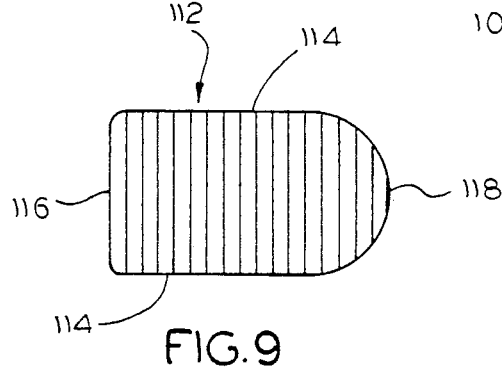
FIG. 9 is a top plan view of still another corrugated filter element having a single curvilinear end for use in restricted environments demanding particular configurations, not shown.

FIG. 9 shows a filter element 112 having straight sides 114 interconnecting a flat or trapezoidal end 116 to a curvilinear end 118. Once again, this may be a necessary configuration for the filter element 112 in a particular environment.

Figure 10:
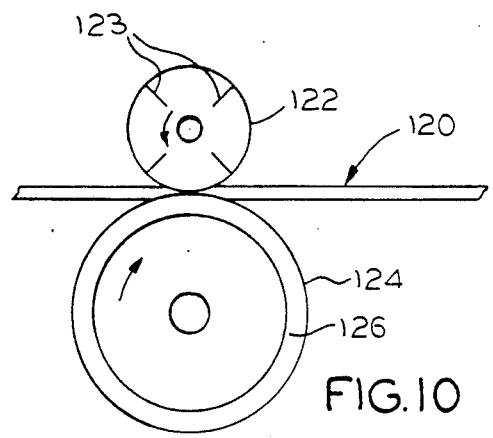
FIG. 10 is a schematic elevational view of means for continuous scoring of strip filter material into elongated tapered filter blanks of the type contemplated by the present invention.

One method for cutting the filter blanks from a strip-like material 120, seen in FIG. 10, can be a semi-continuous one where rotating cutter means 122 carries suitable schematically shown die means 123 that impress or cut the strip matreail 120 by applying pressure under a supporting rotating means 124 which can includes a semi-impressionable outer periphery 126, as is well known in the art.

Figure 11:
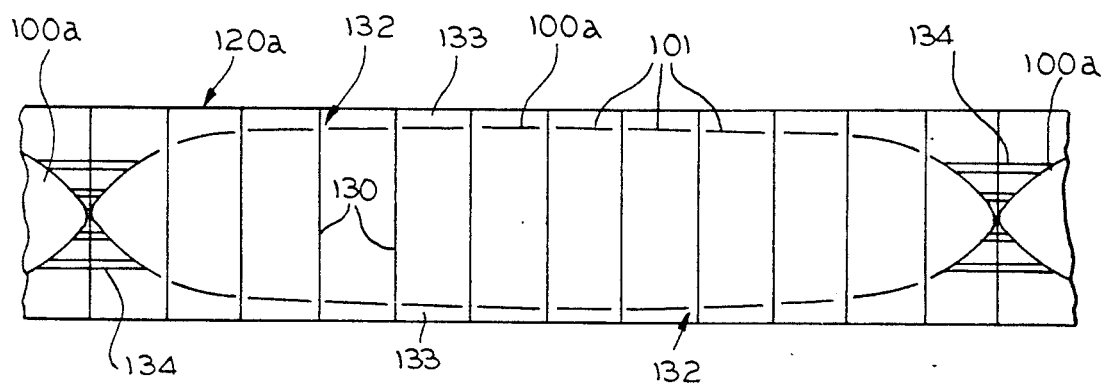
FIG. 11 is a partial plan view of a strip of filter material which has been intermittently scored adjacent corrugation fold lines as means for controlling the lateral scrap, with successive filter elements, before corrugation, being interconnected by thin webs of material.

A rotary cutter of the type described, or a punch press type of die cutter, can be utilized in the preparation of filter blanks of the type shown in FIG. 11, A strip-like material 120a can be impressed with spaced cuts 101 that define the outline of the filter blank 100a but which are interrupted by the spaces 132 (shown in exaggerated condition) adjacent the corrugation folds 130. The slight material occupying spaces 132 is adequate to maintain the outer scrap strip 133 as a single element which can be more readily contolled than a plurality of little scraps which can clog the cutting apparatus. The sequentially arranged filter means 100a can also be interconnected by suitable means such as the frangible strap means 134, which again provides means for controlling the blanks prior to corrugation.

Thus, the present invention contemplates a method of manufacture and article of manufacture that clearly focuses on a solution for improving the configuration of corrugated air filters that will permit increased filter element area within a presently available package or housing as well as providing requirements, as well as providing means for accomodating external peripheral configurations utilizing at least one curvilinear portion. By changing the amplitude or frequency of corrugations in the design of a filter element of the type contemplated herein the manufacture can readily modify his production to meet the customers needs. Similarly, by end to end or side by side layout of the filter element blanks utilized in this invention, as well as intermittent scoring for control of scrap, economies in cost of fabrication can be realized.

Other embodiments of the present invention as well as mechanical equivalents will be apparent to those skilled in the art and it is not my intent to limit the scope of this invention.

I claim:

1. A filter device including a corrugated filter member, an encircling support member integrated with said filter member, said filter member initially being flat and having its peripheral margins defining an elongated strip-like configuration tapered from its midsection toward its ends, said filter member when corrugated from its initially flat condition generally defining a filter member having a curvilinear portion at said ends when viewed in plan, said margins being insert molded into and integrally encapsulated by said support member, said support member having a body portion generally cylindrical in configuration and extending axially at least to the ends of said filter member and overlies a portion of the margins of said filter member adjacent both of said ends of said filter member, said support member further including a flange means extending laterally intermediate the ends of said cylindrical body portion and container means having means for gripping engagement with said support member, said container means adapted for engagement with conduit means carrying a fluid medium desired to be filtered.

2. A contained filter device as claimed in claim 1 wherein said container means is substantially complimentary to said cylindrical body portion, said container means including two complementary elements accepting and sealing against said flange means.

3. A contained filter device as claimed in claim 2 wherein said container means includes complementary elements each of which are generally cup-shaped in configuration with an open end and a close end and each include a laterally extending circumferentially disposed flange element adjacent each open end, with said container means formed with said open ends of said elements being in juxtaposed opposition.

4. A contained filter device as claimed in claim 3 wherein one of said container means flange elements includes an axially extending skirt portion that surrounds the outer peripheral edge of said other container means flange element, whereby the flange means on said support element is sealingly captured between said two container means flange elements integral with said cup-shaped container elements.

5. A contained filter device as claimed in claim 4 wherein said support element flange means includes at least one flexible circumferentially disposed sealing lip means for engagement with at least one of said flange elements on said cup-shaped container elements.

6. A contained filter device as claimed in claim 5 wherein said container elements are retained in assembled relation by suitable fastener means.

7. A contained filter device as claimed in claim 6 wherein said fastener means is carried integrally with one of said container elements.

8. A contained filter device as claimed in claim 7 wherein said fastener means is a pivotable spring means axially secured on said one container element and having means for engaging in spring loaded fashion the flange of said other container element.

9. A contained filter device as claimed in claim 5 wherein said lip means are at least two in number of extend flexibly in opposite axial directions to engage both of said container element flange means.

10. A filter device as claimed in claim 1 wherein said filter member when corrugated from its initially flat condition generally defines a circle when viewed in plan.

11. The method of fabricating a fluid filter device including the steps of providing cutting means for cutting an elongated strip-like filter element from a thin filter material, said element having a border that tapers from its midsection toward at least one end, corrugating said filter element with the axially disposed corrugated filter element taking a curvilinear peripheral form at said tapered end, integrating the edges of said filter element by insert molding said edges in a retaining member having an internally complimentarily shaped bore therethrough with the edges of said filter element being embedded in said retaining member, forming means on said retaining member for association with housing means to support and seal said filter and retaining member within said housing means for exposing said filter element to the fluid material to be filtered.

12. The method set forth in claim 11 wherein said filter element in its flat condition is initially tapered towards both ends and when corrugated forms substantially a circle when viewed in plan.

13. The method set forth in claim 12 wherein said retaining member is generally cylindrical in configuration, said flange means is formed substantially continuous and circumferentially disposed about said retaining member.

14. The method set forth in claim 13 wherein said flange means is formed with integral seal means for cooperation with said housing means.

15. The method set forth in claim 14 wherein said seal means consists of annular resilient means extending axially from said flange means for compression by said housing means when associated therewith, whereby an integral seal is provided between said retaining member and said housing, as well as with said filter element which is inserted molded in said retaining member.

16. The method set forth in claim 11 wherein said cutting means produces intermittent spaced cuts defining the outline of said filter element and laterally disposed scrap with said laterally disposed scrap maintained as an integral element to increase the efficacy of its disposal.

17. The method set forth in claim 16 wherein successive ones of said filter element formed from said strip-like material are interconnected by frangible strap means so that filter elements are maintained in strip-like array prior to feeding into corrugating means.

18. The method set forth in claim 11 wherein said filter element is inserted molded in said retaining element which is formed of a thermoplastic material.

19. The method set forth in claim 11 wherein said retaining element is provided with a molded laterally extending supporting flange means.

20. The method set forth in claim 11 wherein said cutting means is rotary and continuously cuts said strip-like material into the filter element ready for corrugation.

* * * * *